(12) United States Patent
Hara

(10) Patent No.: US 6,895,241 B2
(45) Date of Patent: May 17, 2005

(54) DOOR-LOCK-OPENING METHOD FOR HOME DELIVERY LOCKER

(75) Inventor: Kouichiro Hara, Tokyo (JP)

(73) Assignee: Kabushiki Kaisha Fulltime System, Tokyo (JP)

( * ) Notice: Subject to any disclaimer, the term of this patent is extended or adjusted under 35 U.S.C. 154(b) by 469 days.

(21) Appl. No.: 09/908,705

(22) Filed: Jul. 20, 2001

(65) Prior Publication Data

US 2002/0025804 A1 Feb. 28, 2002

(30) Foreign Application Priority Data

Jul. 24, 2000 (JP) ..................................... P2000-222238

(51) Int. Cl.[7] .......................... H04Q 7/20; H04M 3/16; H04M 3/42; H04M 3/00; G06F 7/04
(52) U.S. Cl. ...................... 455/420; 455/410; 455/347; 455/352; 455/414.1; 455/425; 455/466; 340/5.5; 340/5.8; 340/5.81; 340/5.91
(58) Field of Search ................................ 455/347, 899, 455/410–411, 412.1, 412.2, 413, 414.1, 415, 418, 424–425, 435.1, 466, 550.1, 554.1, 554.2, 419–420, 403, 352, 152.1, 152.4, 345, 353, 557; 340/5.8, 5.81, 5.9, 5.91, 825.31, 5.5, 5.61, 10.31, 66

(56) References Cited

U.S. PATENT DOCUMENTS 4,894,717 A    1/1990   Komei ........................ 358/108
6,161,005 A  * 12/2000   Pinzon ........................ 455/403
6,323,782 B1 * 11/2001   Stephens et al. ........... 340/10.31

FOREIGN PATENT DOCUMENTS

JP              9-330458         12/1997

* cited by examiner

Primary Examiner—William Trost
Assistant Examiner—Meless Zewdu
(74) Attorney, Agent, or Firm—Armstrong, Kratz, Quintos, Hanson & Brooks, LLP

(57) ABSTRACT

In a door-lock-opening method for a home delivery locker which includes a home delivery locker and a managing company that are connected to each other through a line, the managing company controlling depositing and taking-out processes of the home delivery locker, a person who wishes to take out a parcel addressed to the person from the home delivery locker is allowed to communicate with the managing company through a mobile terminal such as a mobile telephone, and in the case when the company has confirmed that the person who made contact therewith is a registered user of the home delivery locker, the company releases the lock of the door of the home delivery locker housing the parcel. In conventional home delivery lockers, the card received from the managing company is read by the card reader that is built in the home delivery locker so as to release the lock of the door; therefore, the resulting problem is that, if a resident is not carrying the card, or if the resident has lost the card, he or she cannot take out the corresponding parcel even after he or she has found the notice on his or her arrival. The present invention makes it possible to solve this problem.

4 Claims, 2 Drawing Sheets

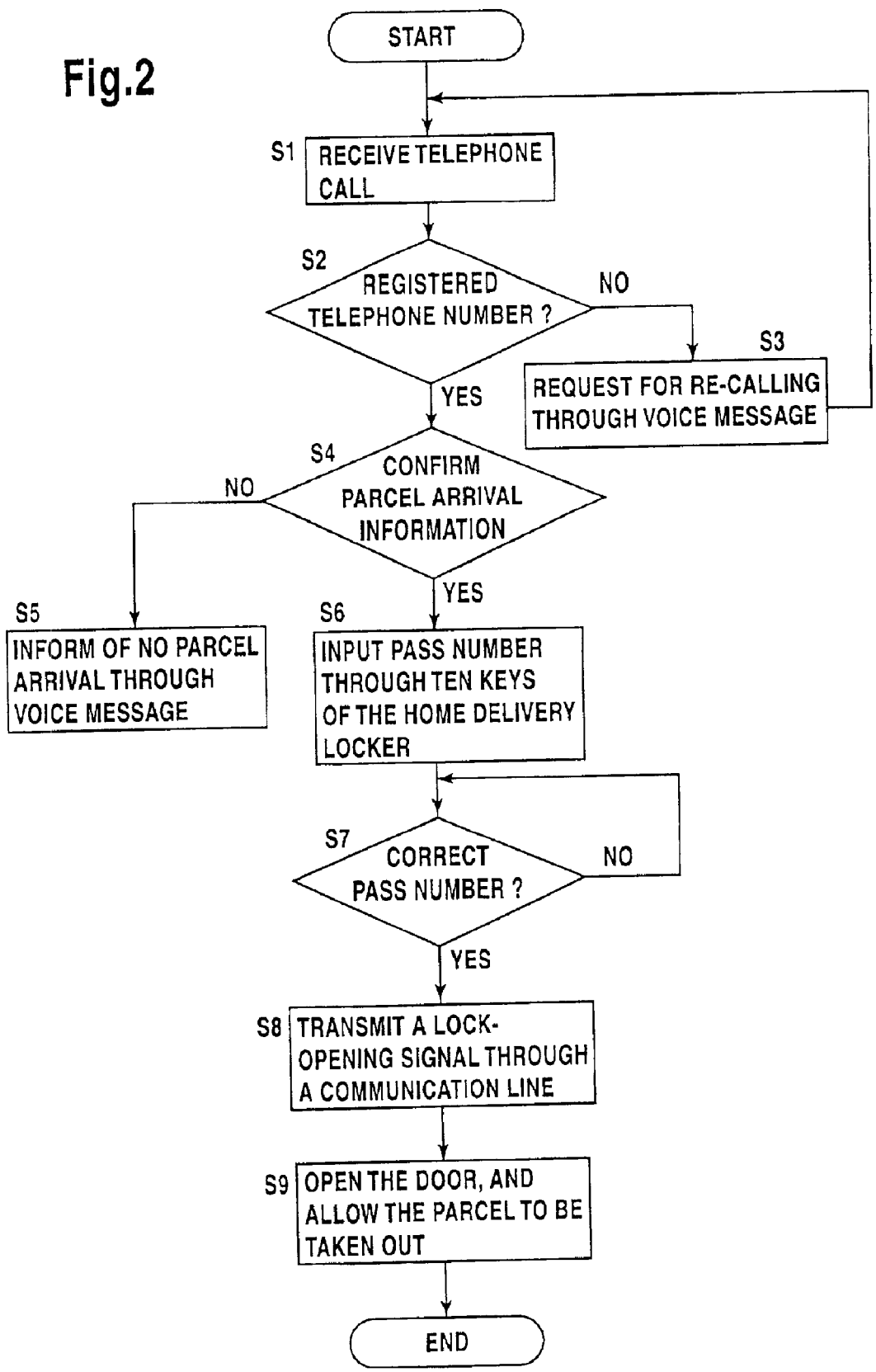

DOOR-LOCK-OPENING METHOD FOR HOME DELIVERY LOCKER

BACKGROUND OF THE INVENTION

1. Field of the Invention

The present invention relates to a door-lock-opening method for a home delivery locker the door of which is lock-opened through a mobile terminal such as a mobile telephone.

2. Description of the Related Art

In the case of a conventional method for depositing a parcel in a home delivery locker installed in a condominium or a tenant building, etc., after a delivery person who has brought the parcel has inputted the room number, etc. of the delivery end, the delivery person deposits the parcel in an empty locker. Then, since a notice is issued from a printer attached to the home delivery locker, the delivery person puts the notice into the mail box of the inputted room number.

Here, a computer, installed in the home delivery locker, stores data, such as information as to which delivery company has deposited a parcel in a home delivery locker in which room at what time, in a memory, and the data is accessed by a computer in the managing company through a communication line, or the data is automatically outputted to the computer of the managing company from the computer in the home delivery locker, when the communication line is always connected thereto.

The resident of the above-mentioned room number, who has found the notice, inserts a card that the receiver preliminary received from the managing company of the home delivery locker into a card reader of the home delivery locker so as to be read; thus, the door of the locker housing the parcel automatically opens, thereby allowing the resident to take the parcel out.

However, in this home delivery locker having the above-mentioned arrangement, the resident allows the card received from the managing company to be read by the card reader that is built in the home delivery locker so as to release the lock of the door; therefore, the resulting problem is that, if the resident is not carrying the card, or if the resident has lost the card, he or she cannot take out the corresponding parcel even after he or she has found the notice on his or her arrival.

SUMMARY OF THE INVENTION

The present invention has been devised to solve the above-mentioned problems, and its objective is to provide a door-lock-opening method for a delivery locker having the following arrangement: when the resident takes out a parcel addressed to him or her, the resident transmits a signal to the managing company from his or her mobile terminal, such as a mobile telephone, and after the managing company has automatically identified him or her, the managing company sends a door-opening signal through a communication line so that even when the resident is not carrying the card, he or she is allowed to release the lock of the door of the home delivery locker, and to take the corresponding parcel out.

In order to achieve the above-mentioned objective, the door-lock-opening method for a home delivery locker of the present invention is provided with the steps of: preparing a home delivery locker and a managing company that are connected to each other through a line, the managing company controlling depositing and taking-out processes of the home delivery locker allowing a person who wishes to take out a parcel addressed to the person from the home delivery locker to communicate with the managing company through a mobile terminal such as a mobile telephone; and in the case when it is confirmed by the company that the person who made contact therewith is a registered user of the home delivery locker, allowing the company to release the lock of the door of the home delivery locker housing the parcel.

Here, the door-lock-opening method for a home delivery locker is characterized in that after having been confirmed that the person is a registered user by the managing company, the person is allowed to input a pass number by operating ten keys attached to the delivery locker, and after it has been determined that the pass number is correct, a lock-opening signal is transmitted to the door.

Moreover, the door-lock-opening method for a home delivery locker is provided with the steps of: preparing a delivery locker; allowing a person who wishes to take out a parcel addressed to the person from the home delivery locker to communicate with the home delivery locker through a mobile terminal such as a mobile telephone; and in the case when it is confirmed by the delivery locker that the person who made contact therewith is a registered user of the home delivery locker, allowing the delivery locker to release the lock of the door of the home delivery locker housing the parcel.

Furthermore, the door-lock-opening method for a home delivery locker is characterized in that after having confirmed that the person is a registered user in the home delivery locker, the person is allowed to input a pass number by operating ten keys attached to the delivery locker, and after it has been determined that the pass number is correct, a lock-opening signal is transmitted to the door.

BRIEF DESCRIPTION OF THE DRAWINGS

FIG. 2 is a flow chart that shows the operation of the system.

DESCRIPTION OF THE EMBODIMENTS

Figure 1:
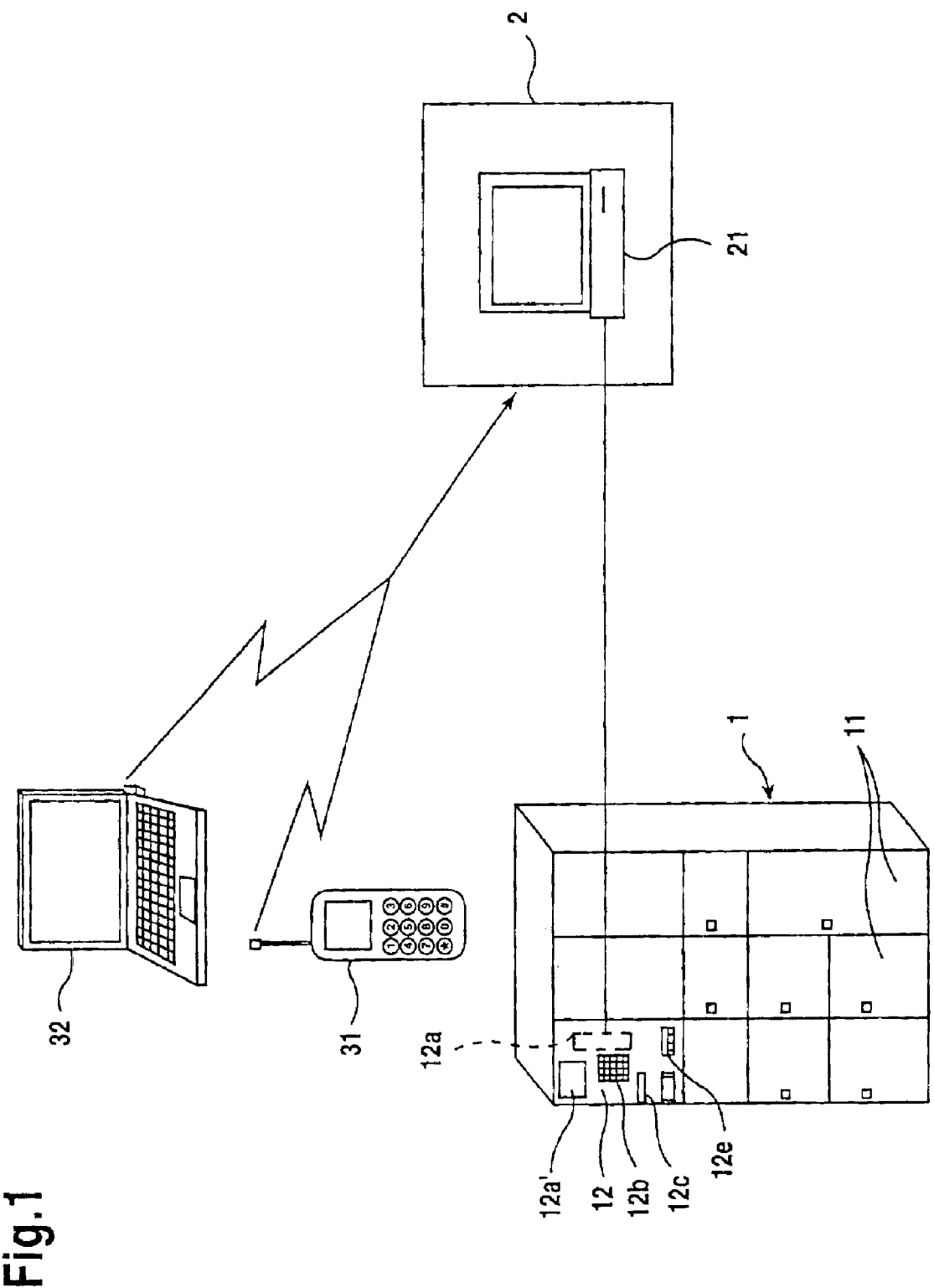
FIG. 1 is a drawing that shows a system for carrying out a door-lock-opening method for a home delivery locker in accordance with the present invention.

Next, referring to Figures, an explanation will be given of one embodiment of a door-lock-opening method for a home delivery locker in accordance with the present invention.

FIG. 1 is a drawing that shows a system for carrying out the door-lock-opening method for a home delivery locker, and reference number 1 represents a locker cabinet placed at an entrance of a condominium or a tenant building, etc., which is disclosed by, for example, Japanese Patent Application Laid-Open No. 9-330458. This locker cabinet 1 is provided with a plurality of boxes 11 having different sizes, and a control lockers 12 that is operated by a delivery person when the delivered parcel is stored and is also operated by a resident when the parcel is taken out.

This control box 12 is provided with a computer 12a, operation keys 12b, such as ten keys, a card reader 12c that reads a card which the delivery person has preliminarily borrowed from a managing company 2, which will be described later, so as to put parcels into the lockers, a sensor, not shown, which detects the fact that a parcel is housed in the locker 11 or that the parcel is taken out of the box, a monitor 12d for displaying a sequence of operations, etc., and an electric lock, not shown, for locking a door of the locker 11.

Moreover, a printer 12e, which prints a notice and a deposition receipt that show that the delivery person has deposited a parcel, etc., are installed inside the control box 12. Here, the computer 12a is connected to a computer 21 in the managing company 2 through a modem and a communication line.

In the home delivery locker cabinet 1, the delivery person inserts the borrowed card belonging to the delivery company into the card reader 12c, and also inputs the room number of the delivery end through the operation keys 12b. Here, the computer 12a stores the contents (name of the delivery company, etc.) of the card that have been read by the card reader 12c and the room number of the delivery end in its memory. Then, the numbers of some empty lockers 11, stored in the memory, are displayed on the monitor, and when the delivery person selects the number of a box suitable for the size of the parcel through the operation keys 12b such as ten keys, the door of the corresponding locker 11 in its locked state is opened.

Next, when the delivery person puts the parcel in the locker 11 thus opened, the sensor detects the deposited state of the parcel, and when the door has been closed, the fact that the parcel has been housed is stored in the memory of the computer 12a. Simultaneously with these operations, the printer 12e pints out a notice and a deposit receipt so that the delivery person puts the notice in the mail box corresponding to the room number that has been inputted, and brings the deposit receipt back.

Reference number 2 represents the managing company that manages the home delivery locker cabinet 1, and a computer 21 of the managing center 2 is connected to the computer 12a of the home delivery locker cabinet 1 through a communication line; therefore, in the case of a full-time connection, the parcel delivery information of the home delivery locker cabinet 1 is stored in the computer 21 in real time, or the computer 21 makes an access to the computer 12a of the home delivery locker cabinet 1 so as to store the parcel delivery information.

Reference number 31 represents a mobile telephone owned by the resident, and 32 is a mobile computer owned by the resident; and in the case of the mobile telephone 31, its number is registered in the managing company, and in the case of the computer 32, its electronic mail address is registered in the managing company.

Next, referring to a flow chart of FIG. 2, an explanation will be given of the operation of the above-mentioned arrangement. This explanation on the operation exemplifies a case in which, by using the mobile telephone 31 the number of which has been registered in the managing company 2 by the resident, the resident takes out a parcel addressed to him or her from the home delivery locker cabinet 1.

When the resident makes a phone call to the managing company 2 through the mobile telephone 31, the computer 21 detects the receipt of the phone call (step S1), and makes a determination as to whether or not the received telephone number has been registered (step S2). Here, if the resulting determination is that the telephone number is not registered, an automatic voice answering device in the computer 21 is operated so that a message which asks the caller to call back through a registered mobile telephone 31 since the current mobile telephone 31 has not been registered is given (step S3).

In contrast, if the resulting determination is that the received telephone number has been registered, it checks to see whether or not any parcel addressed to the resident who has registered the telephone number is housed in a cabinet 11 of the home delivery locker cabinet 1, that is, it retrieves the delivered parcel information that has been preliminarily stored for any parcel addressed to the resident (step S4). If there is not any corresponding delivered parcel information, a message is given so as to show that no parcel has been delivered through the automatic voice answering device (step S5).

Moreover, if there is any corresponding information that has been stored, it asks the resident to input the pass number that has been preliminarily given by the managing company through operations on the ten keys 12b installed in the home delivery locker cabinet 1 (step S6). Then, the computer 21 makes a determination as to whether or not the inputted pass number is right (step S7), and when it is determined that the pass number is correct, the computer 21 transmits a signal for applying power to the electric lock of the locker 11 of the home delivery locker cabinet 1 (step S8).

Upon receipt of the signal for applying power to the electric lock, the computer 12a in the home delivery locker cabinet 1 applies power to the electric lock so as to open the door, thereby allowing the resident to take the parcel out (step S9). Here, the above explanation on the operations has been given of lock-opening processes by the use of the mobile telephone 31; and in the case of voice communications by the use of a mobile computer 32 also, the same processes are carried out; therefore, the description thereof is omitted.

In contrast, in the case when data is transmitted to the computer 21 of the managing company 2 as character information by using the mobile computer 32, a mail address is used in place of the telephone number and character information is converted to the voice information in the computer 32 so that the lock-opening processes are carried out in the same manner as those carried out by the mobile telephone. Moreover, in the case when the lock-opening processes are carried out by using the mobile computer 32, not limited to the managing computer 21 in the managing company 2, the connection may be made to a web sponsored by the managing company 2 through the Internet.

Moreover, in the above-mentioned embodiment, the explanation has been given on the assumption that the telephone number of the mobile telephone and the mail address have been preliminarily registered; however, in the case when an access is made to the computer 21 of the managing company 2 from another mobile telephone or mail address, an ID number which has been preliminarily given by the managing company may be inputted in lieu of the registration of the telephone number or the mail address.

Furthermore, the above-mentioned embodiment has exemplified a case in which the lock-opening instruction is given to the computer 21 of the managing company 2 by using a telephone and an electronic mail; however, another arrangement may be proposed, in which all the information stored in the computer 21 is stored in the computer 12a of the home delivery locker cabinet 1, and all the operations carried out by the computer 21 of the managing company 2 are carried out by the computer 12a of the home delivery locker cabinet 1 so as to release the lock.

Here, the above-mentioned embodiment has exemplified a case in which the home delivery locker cabinet 1 is placed in a condominium and a tenant building; however, with respect to the installation place of the home delivery locker, not limited to the above-mentioned places, it may be installed in any place, for example, an individual house, etc. In short, the important point is that only the registered resident having a contract with the managing company 2 is allowed to use the system.

As described above, in the arrangement of the present invention which includes a home delivery locker and a managing company that are connected to each other through a line, the managing company controlling depositing and taking-out processes of the home delivery locker, a person who wishes to take out a parcel addressed to the person from the home delivery locker is allowed to communicate with the managing company through a mobile terminal such as a mobile telephone, and in the case when the company has confirmed that the person who made contact therewith is a registered user of the home delivery locker, the company releases the lock of the door of the home delivery locker housing the parcel. With this arrangement, upon taking out a parcel addressed to him or her, even when the person is not carrying the corresponding card, he or she is allowed to communicate with the managing company through a mobile terminal such as a mobile telephone so as to release the lock of the door of a home delivery locker and to take the parcel out.

Moreover, in this arrangement, after having been confirmed that the person is a registered user by the managing company, the person is allowed to input a pass number by operating ten keys attached to said delivery locker, and after it has been determined that the pass number is correct, a lock-opening signal is transmitted to the door; thus, it is possible to prevent a fraudulent taking-out process of a parcel.

What is claimed is:

1. A door-lock-opening method for a home delivery locker comprising the steps of:

providing a home delivery locker and a managing company that are connected to each other through a communication transmitting line, said managing company controlling depositing and taking-out processes of said home delivery locker;

allowing a person who wishes to take from the home delivery locker a parcel addressed to the person to communicate with said managing company via a signal from a mobile terminal, such as a mobile telephone, conducted through said communication transmitting line; and following confirmation by said managing company that the person who communicated therewith is a registered user of said home delivery locker, effecting release by said company of the lock of the door of said home delivery locker housing the parcel via said communication transmitting line.

2. The door-lock-opening method for a home delivery locker according to claim 1, wherein, after having been confirmed by said managing company that the person is a registered user, allowing the person to input a pass number by operating keys attached to said delivery locker, and, after determining that the pass number is correct, transmitting a lock-opening signal via said communication transmitting line to release the door.

3. A door-lock-opening method for a home delivery locker comprising the steps of:

providing a home delivery locker;

allowing a person who wishes to take from said home delivery locker a parcel addressed to the person to communicate with said home delivery locker via a signal from a mobile terminal, such as a mobile telephone, through a communication transmitting line; and following confirmation by said delivery locker that the person who communicated therewith is a registered user of said home delivery locker, effecting release by transmission of a signal to said home delivery locker of the lock of the door of said home delivery locker housing the parcel.

4. The door-lock-opening method for a home delivery locker according to claim 3, wherein, after having confirmed by said home delivery locker that the person is a registered user, allowing the person to input a pass number by operating keys attached to said home delivery locker, and after determining that the pass number is correct, transmitting a lock-opening signal via said communication transmitting line to release the door.

* * * * *